(No Model.)
N. EDWARDS.
FRICTIONAL CONNECTION FOR THE BARS AND SLATS OF WINDOW BLINDS.
No. 280,156. Patented June 26, 1883.
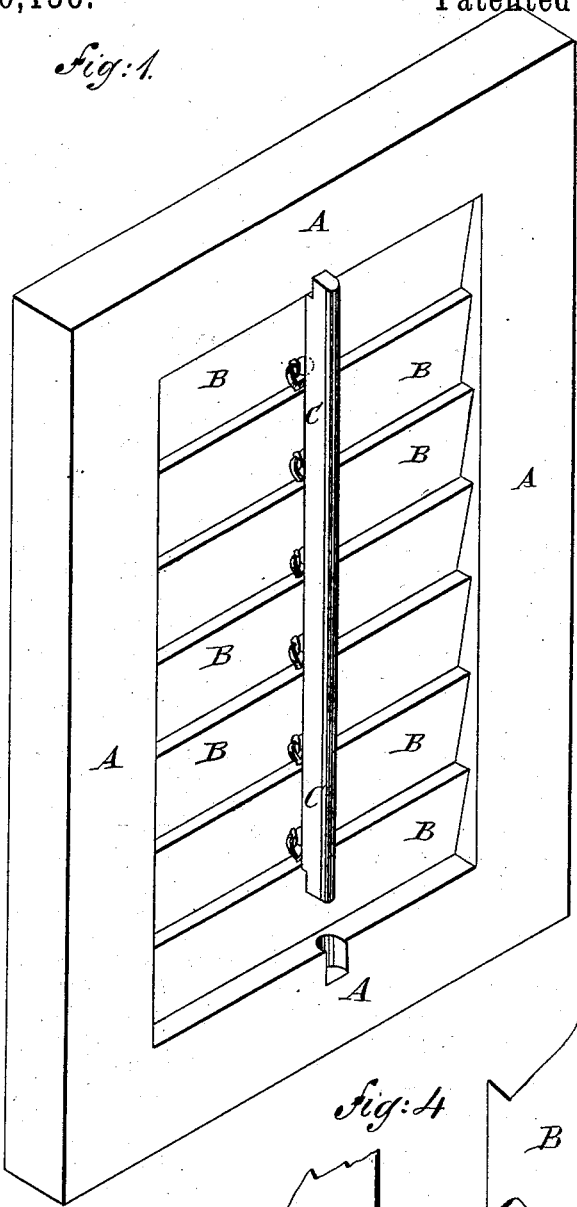
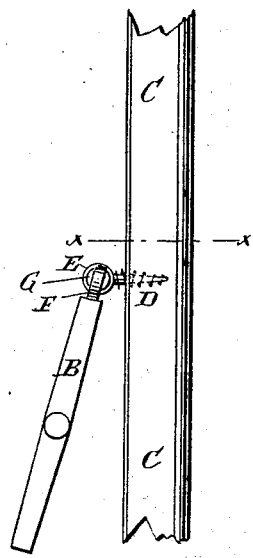
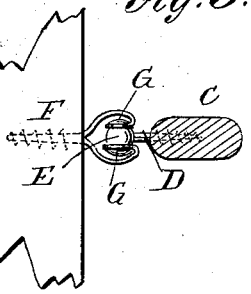
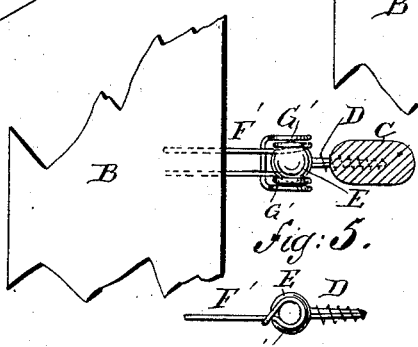
WITNESSES:
Chas. Nicol
C. Sedgwick
INVENTOR:
N. Edwards
BY Munn & Co
ATTORNEYS.

UNITED STATES PATENT OFFICE.

NELSON EDWARDS, OF JERICHO, VERMONT.

FRICTIONAL CONNECTION FOR THE BARS AND SLATS OF WINDOW-BLINDS.

SPECIFICATION forming part of Letters Patent No. 280,156, dated June 26, 1883.

Application filed May 5, 1883. (No model.)

*To all whom it may concern:*

Be it known that I, NELSON EDWARDS, of Jericho, in the county of Chittenden and State of Vermont, have invented a new and useful Improvement in Frictional Connections for the Bars and Slats of Window-Blinds, of which the following is a full, clear, and exact description.

Reference is to be had to the accompanying drawings, forming a part of this specification, in which similar letters of reference indicate corresponding parts in all the figures.

Figure 1 is a perspective view of a window-blind to which my improvement has been applied. Fig. 2 is a side elevation of the improvement, shown as connecting a bar and slat. Fig. 3 is a plan view of the same, the bar being shown in section through the line $x\ x$, Fig. 2. Fig 4 is a plan view of a modification of the construction of the improvement, shown as applied to a bar and slat. Fig. 5 is a side elevation of the modification.

The object of this invention is to prevent the slats of window-blinds, when adjusted, from getting out of position.

The invention consists in a frictional connection for the bars and slats of window-blinds, constructed with a screw having a spherical head, and a screw or staple having a forked head provided with bearings to rest against the opposite sides of the said spherical head, and by their friction hold the slats and bar, to which they are attached, securely at any desired angle, as will be hereinafter fully described.

A represents the frame, B the slats, and C the bar of an ordinary window-blind.

D is a small screw, which is made with a spherical head, E, and which is designed to be screwed into the slat-bar C of a window-blind.

F is a small screw, the head of which is forked, and the ends of the prongs thus formed are bent inward, as shown in Fig. 3, and have their ends widened and concaved to form bearings G, to rest against the opposite sides of the spherical head E, where they are held in place by the elasticity of the prongs of the screw F. With this construction the friction between the head E and the bearings G will hold the bar C and slot B in any position into which they may be adjusted, so that the slats can be adjusted and held at any desired angle.

In the modification shown in Figs. 4 and 5 the screw F is replaced by a staple, F', the middle part of which is bent to form bearings G', to rest against the opposite sides of the head E and hold the slat B and bar C in position.

In applying the improvement to practical use it will generally be sufficient to connect one slat with the bar by a frictional connection, the other slats being connected with the said bar by the ordinary hinging-staples.

Having thus fully described my invention, I claim as new and desire to secure by Letters Patent—

1. A frictional connection for the bars and slats of window-blinds, constructed substantially as herein shown and described, and consisting of a screw having a spherical head, and a screw or staple having a forked head provided with bearings, as set forth.

2. The combination, with the bar C and a slat, B, of a window-blind, of the screw D, having a spherical head, and the screw or staple F, having a forked head provided with bearings G, substantially as herein shown and described, whereby the said slats will be held at any desired angle by the friction of the said head and bearings, as set forth.

NELSON EDWARDS.

Witnesses:
JAMES T. GRAHAM,
EDGAR TATE.